May 15, 1951 E. B. PECHSTEIN 2,553,061
ROTARY FLOODLIGHT
Filed Dec. 28, 1945 2 Sheets-Sheet 1
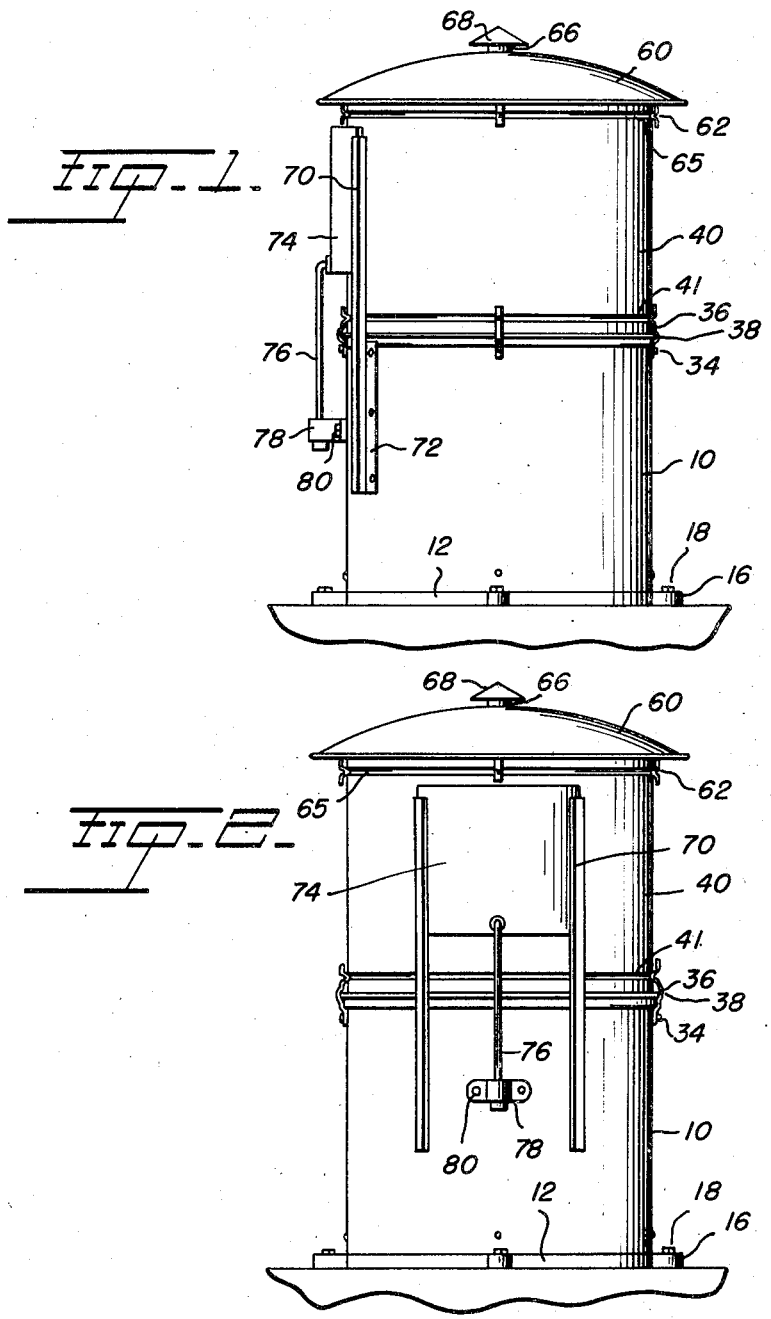
INVENTOR.
ERNEST B. PECHSTEIN
BY *Victor J. Evans & Co.*
ATTORNEYS May 15, 1951 E. B. PECHSTEIN 2,553,061
ROTARY FLOODLIGHT
Filed Dec. 28, 1945 2 Sheets-Sheet 2

INVENTOR.
ERNEST B. PECHSTEIN
BY Victor J. Evans & Co.
ATTORNEYS

UNITED STATES PATENT OFFICE 2,553,061

ROTARY FLOODLIGHT

Ernest B. Pechstein, Vista, Calif.

Application December 28, 1945, Serial No. 637,728

3 Claims. (Cl. 240—49)

This invention relates to a rotary floodlight which is especially adapted to be used in the illumination of large areas, such as, airfields, industrial areas, railroad yards, stadiums, construction jobs and the like.

A particular advantage of this device over the stationary floodlight is that, it will illuminate an area many times as great with substantially the same apparent intensity, per unit of area, using the same amount of energy as the one floodlight (using lamps of the same voltage), plus a small additional amount of energy for the driving motor.

Thus the device may supply floodlighting at less cost than by present methods of lighting. It may further serve the purpose of an airplane beacon at airports, using the required color in a portion of the cylindrical lens, or it may flash a beam of colored light at fixed intervals by interposing an auxiliary colored lens at timed intervals as will be later explained.

An object of the invention therefore is to provide a rotary floodlight, consisting essentially of a fixed lamp, with a motor driven reflector, revolving about it in such a manner that the narrow concentrated beam of light which it projects will cover a complete circle with the lamp at the radius point.

Another object of the invention is to provide a rotary floodlight wherein the beam light directed thereby would have a width of one or two degrees of arc. Since the reflector therein would be revolving, at a motor speed of 3600 R. P. M., the complete area covered would be illuminated sixty times per second giving to the eye the appearance or effect of continuous brilliant illumination.

The revolving reflector and lamp may be enclosed in a cylindrical lens, which could modify by its design the characteristics of the light beam in the whole area covered or change it to suit requirements in certain parts of the area; for instance, it may be desirable to furnish illumination in a horizontal plane in 100 degrees of arc, a colored light in 80 degrees of arc and floodlighting from the horizontal plane to the zenith in the remaining 180 degrees of arc.

A further advantage of this device in the illumination of airfields is that a very large area outside the confines of the landing strips and the airport itself would be lighted, revealing the terrain and any attendant hazards.

A further object of the invention is to provide a device which would lower maintenance costs since a far smaller number of lighting units would be used to illuminate a given area.

The decreased hazard due to less obstruction in the way of floodlights would therefore be a decided advantage.

With the above and other objects and advantage in view the invention consists of the novel details of construction arrangement and combination of parts more fully hereinafter described, claimed and illustrated in the accompanying drawings in which Figure 1 is an elevational view of an embodiment of the invention.

Figure 2 is the same turned at a ninety degree angle.

Figure 3:
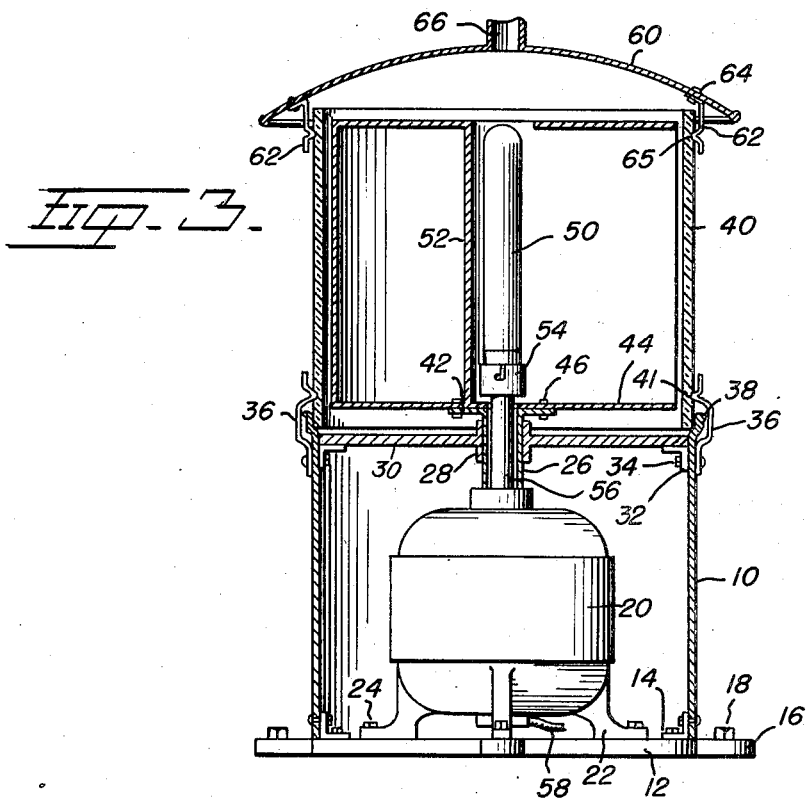
Figure 3 is a vertical sectional view thereof.
Figure 4:
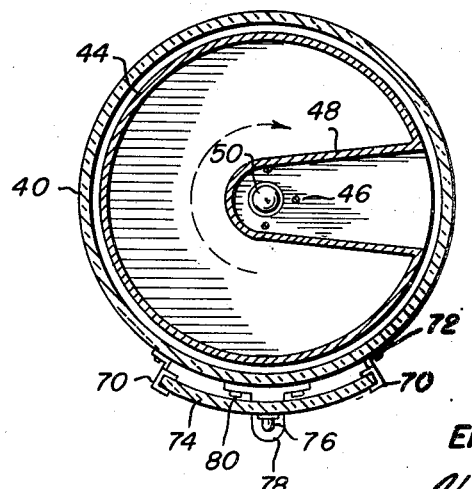
Figure 4 is a transverse sectional view thereof.

Referring more in detail to the drawings the reference numeral 10 designates the circular lens support which is secured to the base 12 by brackets 14. The base 12 is provided with apertured ears 16, which secures the base to any desirable supports by means of fasteners 18 received thereby.

A motor 20 having apertured feet 22 is secured to the base 12 by fasteners 24 and is provided with the hollow drive shaft 26, which is journalled in the bearing 28 in the circular guide and support plate 30, which engages the brackets 32, secured to the upper inner periphery of the lens support 10 by fasteners 34, these fasteners also securing to the outer periphery of the support 10 the spring clips 36.

The upper marginal rim of the support 10 is flared at 38 to support the circular lens 40 and the clips 36 retain the lens 40 in position. Grooves 41 are provided in the lens 40 to receive the ends of the spring clips.

The upper end of the drive shaft 26 is flanged at 42 to receive the reflector unit 44 thereon and the reflector unit 44 is secured to the flange 42 by fasteners 46.

As shown the reflector 44 is hollow and is provided with an inwardly disposed sector 48 through which the beam of light from the lamp 50 is directed.

Thus the sector may be formed to direct any desired arc of light beam through the lens 40, which may be colored or plain as desired.

The reflector unit 44 is provided with a vertical partition 52, which acts as a counterbalance for the reflector and its sector as it revolves.

As previously stated the reflector unit 44 is secured to the shaft 26 of the motor 20 and revolves at motor speed.

The lamp 50 is connected to the socket 54, which is supported by a hollow shaft 56, mounted interiorly of the motor shaft 26, and wires 58 are connected thereto to energize the lamp 50.

A circular removeable cover 60 is fastened to the lens 40 by spring clips 62 secured to the cover 60 by fasteners 64 and the lens 40 is provided with grooves 65 to receive the clips 62 and the cover 60 is provided with a heat vent 66 and cap 68.

Channeled tracks 70 secured to the lens support 10 by flanges 72 in spaced vertical relation to each other, movably support a curved lens 74 of different color from the lens 40 which has an arm 76 secured to the lower edge thereof mounted in the support 78, secured to the lens support 10 by fasteners 80.

Various means may be utilized to raise and lower the lens 74 so that a colored beam can be directed from the device at predetermined periods as desired.

To operate the device the motor switch not shown is operated, causing the motor 20 to rotate the reflector 44. When the motor and reflector are revolving at normal speed, the light 50 is energized, resulting in instant and complete illumination of the field.

It might be connected so that one switch can both start the motor and energize the light and a solenoid (not shown) may be adapted to move the lens 74 by a timing device at predetermined periods of illumination.

Rotary floodlights may be used as portable units on construction jobs or on temporary airfields. They may also be used on airplanes for lighting the ground under the plane in flight by attaching the light to the underside of the plane, and the removeable cover 60 may be replaced by a lens so that practically a hemisphere of space may be lighted.

It is believed that the operation and the advantages of the device will be apparent to those skilled in the art and that modifications and changes in the minor details of construction and arrangement of parts may be resorted to without departing from the spirit of the invention and the scope of the appended claims.

Having thus described the invention, what is claimed as new and desired to be secured by Letters Patent is:

1. A device of the character described, comprising a base, a circular lens support secured to said base, an outwardly flared marginal rim on said support, a circular lens mounted on said support within said rim, spring clips secured to said support to retain said lens in position, a removable cover mounted on said lens, spring clips for securing said cover to said lens, brackets carried by said support below the rim thereof, a circular guide plate resting on said bracket, a bearing in the center of said guide plate, a motor mounted on said base interiorly of said lens support below said guide plate, a hollow shaft on said motor journalled in the bearing in said guide plate, a reflector mounted on the drive shaft of said motor, circular grooves in said lens adjacent both outer ends thereof to receive said spring clips, illuminating means mounted within said reflector and means incorporated in said reflector for directing a beam of light from said illuminating means, during the revolution of said reflector by said motor.

2. The invention as defined in claim 1 wherein a curved lens of a different color than said first lens is provided, means is secured to said lens support for guiding and supporting said curved lens on the exterior thereof, and said curved lens is provided with means for moving it into and out of the path of said light beam.

3. The invention as in claim 1 wherein the means for supporting said illuminating means is mounted interiorly of said drive shaft.

ERNEST B. PECHSTEIN.

REFERENCES CITED

The following references are of record in the file of this patent:

UNITED STATES PATENTS

| Number | Name | Date |
|---|---|---|
| 697,868 | Moses et al. | Apr. 15, 1902 |
| 750,455 | Hamm | Jan. 26, 1904 |
| 1,194,135 | Brown | Aug. 8, 1916 |
| 1,295,322 | Hutto | Feb. 25, 1919 |
| 1,417,457 | Cook | May 23, 1922 |
| 1,650,809 | Walch | Nov. 29, 1927 |
| 1,782,065 | Gwynn | Nov. 18, 1930 |
| 2,288,177 | Bailey | June 30, 1942 |
| 2,313,356 | New | Mar. 9, 1943 |
| 2,344,153 | Leonard | Mar. 14, 1944 |

FOREIGN PATENTS

| Number | Country | Date |
|---|---|---|
| 19,577 | England | Aug. 31, 1907 |